United States Patent [19]

Feldkamp et al.

[11] Patent Number: 5,437,599
[45] Date of Patent: Aug. 1, 1995

[54] DAMPED HYDRAULIC BEARING SUPPORT FOR CENTRIFUGE

[75] Inventors: Bernward Feldkamp, Wesel-Buederich; Peter Stelter; Harald Adam, both of Cologne, all of Germany

[73] Assignee: Klockner-Humboldt-Deutz AG, Cologne, Germany

[21] Appl. No.: 181,789

[22] Filed: Jan. 18, 1994

[30] Foreign Application Priority Data

Jan. 21, 1993 [DE] Germany ............. 43 01 485.2

[51] Int. Cl.6 ............................................ B04B 9/14
[52] U.S. Cl. .................................. 494/82; 494/83; 494/53; 210/380.3
[58] Field of Search ............... 210/380.1, 380.3; 384/99, 448, 535, 536; 494/7, 53, 82, 83

[56] References Cited

U.S. PATENT DOCUMENTS

| | | | |
|---|---|---|---|
| 2,631,901 | 3/1953 | Holben | 384/99 |
| 3,685,722 | 8/1972 | Nichols | 494/82 |
| 4,096,988 | 6/1978 | Scucini | 494/7 |
| 4,504,262 | 3/1985 | Forsberg | 494/53 |
| 4,643,592 | 2/1987 | Lewis | 384/448 |
| 5,201,586 | 4/1993 | Zimmermann | 384/448 |

FOREIGN PATENT DOCUMENTS

| | | |
|---|---|---|
| 3734761A1 | 5/1989 | Germany . |
| 3831928A1 | 3/1990 | Germany . |
| 2111136 | 6/1983 | United Kingdom ............. 384/448 |

*Primary Examiner*—David A. Scherbel
*Assistant Examiner*—Terrence R. Till
*Attorney, Agent, or Firm*—Hardaway Law Firm; Charles L. Schwab

[57] ABSTRACT

The material settling on the inside of the centrifuge drum during operation of centrifuges causes imbalances on account of the unavoidable nonuniform mass distribution, which imbalances lead to vibrations and the associated high level of solid-borne sound and bearing wear. The centrifuge drum shaft (15) is supported by an active (variable pressure) hydraulic bearing support (10) that is relatively simple in design and inexpensive to manufacture for this centrifuge application.

8 Claims, 2 Drawing Sheets

DAMPED HYDRAULIC BEARING SUPPORT FOR CENTRIFUGE

TECHNICAL FIELD

This invention relates to a centrifuge for the separation of substances differing in density, having a one-part or multi-part centrifuge drum rotatable about an axis, the drum shaft of which drum is supported in bearings.

BACKGROUND OF THE INVENTION

The material settling on the inside of the centrifuge drum during operation of the centrifuge causes imbalances on account of the unavoidable nonuniform mass distribution, which imbalances lead to vibrations and associated high level solid-borne sound and bearing wear.

Devices for the avoidance of undesired vibrations on rotating machine parts are known. In German patent document DE-OS 37 34 761 it is proposed to support the bearing housing with respect to the machine frame via a multiplicity of coil springs, so as to avoid of high forces and shaking of the bearings and the machine frame that are caused as a consequence of the dead weight of the centrifuge and operationally induced imbalances causing displacement of the rotation axis of the centrifuge.

Another known possibility for the damping of vibrations of rotating machine parts consists in the use of hydraulic bearing supports for mounting, as is proposed, for example, in German patent document DE-OS 38 31 928. These hydraulic bearings have a chamber system filled with a fluid. Vibrations occurring on the rotating machine part are detected by a measurement and control system and transformed via a servo valve into pressure variations in the fluid of the chamber. The pressure variations generated are transmitted as force actions to the external bearing shells of the rotor or, respectively, to the shaft. The force transmission here takes place perpendicularly to the axis of the rotor, via actuating elements that have, for example, a linear ball or roller bearing or consist of flexing bars.

In this known embodiment of a hydraulic bearing support, in which the chamber filled with a fluid is formed from two membranes connected in series, the transmittable forces are limited and larger rotational masses thus cannot be supported with this embodiment. In the case of occurring tangential forces, moreover, it cannot be excluded that the chamber can be displaced correspondingly.

OBJECT AND BRIEF DESCRIPTION OF THE INVENTION

It is an object of the invention further to develop centrifuges of the type hereinbefore described in such fashion than even larger vibrating masses can be adequately damped by means of measures simply formulated in terms of design.

By supporting the centrifuge drum shaft with at least one active hydraulic bearing support as herein described, in addition to considerable damping of the vibrations brought about by means of imbalances, the resonance regions occurring during startup and rundown of the centrifuge can be greatly reduced.

In one embodiment of the invention, in which the centrifuge is a decanter, the horizontally or vertically arranged centrifuge drum shaft is supported by means of active hydraulic bearing support. The active hydraulic bearing support is arranged on the drive end of the centrifuge drum because, in particular, the forces originating from the drive of the centrifuge and acting on the drum shaft can be best compensated there. It is then sufficient to support the other end of the centrifuge drum shaft with a known passive bearing.

In experiments it has been shown that it is sufficient to support the centrifuge drum shaft with only one active hydraulic bearing support. The transport screw arranged inside the centrifuge drum is centered at the same time by means of the centrifuge drum.

In accordance with the invention, centrifuges having vertical drum shaft, for example separators, are supported directly beneath the centrifuge drum with an active hydraulic support because the active supporting of the shaft can optimally apply its effectiveness here.

In advantageous development of the invention, the active hydraulic bearing support for the supporting of centrifuge drum shafts is formulated in particularly simple and inexpensive form. In the housing enclosing the outer bearing ring there are arranged one or a plurality of chamber-like recesses, which are filled with a fluid and are closed with one membrane each against the outer bearing ring. The membrane lies with its entire effective area directly against the outer bearing ring. In case of pressure variations in the fluid, which can be introduced into the fluid by means of a servo valve in the same manner as in the known active hydraulic bearing supports, this pressure is not transmitted to the outer bearing ring in punctual or linear fashion, as in the known bearing supports, or with a small area, as in case of the use of flexing bars, but with the very much larger effective area of the entire membrane, by which means lower pressures are required than in the case of the known bearing supports, given the same force transmission. In particular in the case of decanters, with the large drum shaft diameters, the effect of a larger area relative to punctual or linear force transmission, for example, is advantageous on account of the mass to be moved.

Additionally, for the further damping of vibration, the intermediate space between the bearing ring and the bearing housing in the region or vicinity of the active hydraulic bearing support can be filled with intermediate layers that reduce solid-borne sound, and thus a decoupling of the vibration-generating drum shaft from the bearing housing can be achieved.

In a further embodiment of the active hydraulic bearing support in accordance with the invention, the chamber filled by a fluid is delimited on its radially inner end with respect to the bearing ring by a radially displaceable chamber bottom, and is defined at its radially outer end (toward the side opposite the drum axis) by a membrane. By means of distance variations of the radially displaceable chamber bottom, pressure differences introduced into the chamber by means of the servo valve are transmitted indirectly to the bearing ring via thrust or force transmission elements, which can be made, for example, in ball or roller form, the membrane acting as a spring. The spring action can be intensified by means of a further membrane (or a plurality thereof), which is arranged radially outward of and parallel to the membrane closing the chamber.

By means of the embodiment of the active hydraulic bearing support in accordance with the invention, with a radially displaceable chamber bottom, larger forces can be transmitted than in the case of the previously known devices. By using lateral guidance in the bearing housing for the radially displaceable chamber side walls, tangentially occurring forces remain without action with regard to an oblique position of the chamber.

BRIEF DESCRIPTION OF THE DRAWINGS

Further details, features and advantages of the invention result from the following explanations of exemplary embodiments illustrated in schematic Drawing figures.

DETAILED DESCRIPTION OF THE DRAWINGS

Figure 3:
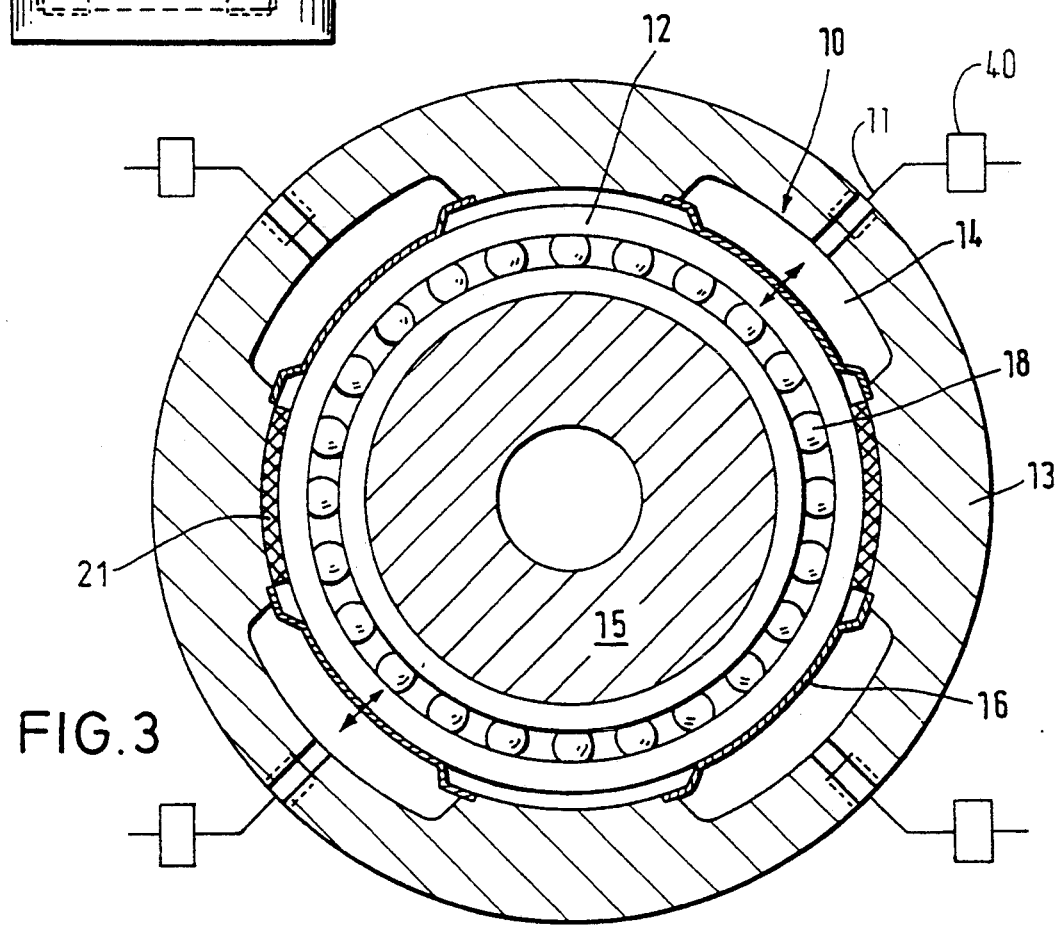
FIG. 3 shows a section through an active hydraulic bearing support having a chamber filled with pressure fluid acting directly on the bearing ring.

FIG. 3 shows an active hydraulic bearing support (10) supporting the drum shaft (15) of a centrifuge, said support having an outer bearing ring (12) enclosing the roll bodies (18) of the bearing, which outer bearing ring is in turn enclosed with clearance by a bearing housing (13). In the bearing housing (13) there are radially recessed four chambers (14), which are arranged at an angular spacing of 90° on the inner periphery of the bearing housing (13). On the radially inner side of the chambers (14), toward outer bearing ring (12), the chambers are closed with a membrane (16), the membrane (16) curving so far that the distance between the bearing housing (13) and the outer bearing ring (12) is bridged over and the membrane (16) lies with its effective radial thrust transmitting area directly against the outer bearing ring (12). The outer bearing ring (12) is thus supported by the membranes (16) and is displaceable in correspondence with the membrane curvatures. The chambers (14) closed by the membrane (16) are filled with a pressure fluid, for example oil, and are connected by a line (11) to pressurized fluid supply via a commercially available servo valve 40.

Vibrations of the drum shaft (15) generated upon operation of the centrifuge, for example by means of imbalances of the centrifuge drum, are detected by means of sensors (not illustrated) and transformed into pressure variations in the pressure fluid of the pressurized fluid supply. Via the servo valve, these pressure variations are introduced into the fluid in the chambers (14) and transmitted via the membrane (16) directly to the outer bearing ring (12), so that this is displaced in correspondence with the pressure exerted. By means of an appropriate actuation of the servo valves, in each case only the chamber (1.4) is pressurized that is located in the circumferential area of the bearing support opposing the vibration directed thereto. In this fashion, the direction and force of vibrations of the drum shaft are compensated (opposed by appropriate force or thrust) and said drum shaft is damped by this means.

For the additional damping of possible vibrations, intermediate layers (21) of sound absorbing material (material capable of reducing solid-borne sound) are arranged in the intermediate space radially between the bearing ring (12) and the bearing housing (13) in the region of the active hydraulic bearing support (10) in such fashion that a decoupling or vibration isolation of the drum shaft from the bearing housing is achieved, which decoupling remains effective even in case of a defect of the active hydraulic bearing support.

Figure 4:
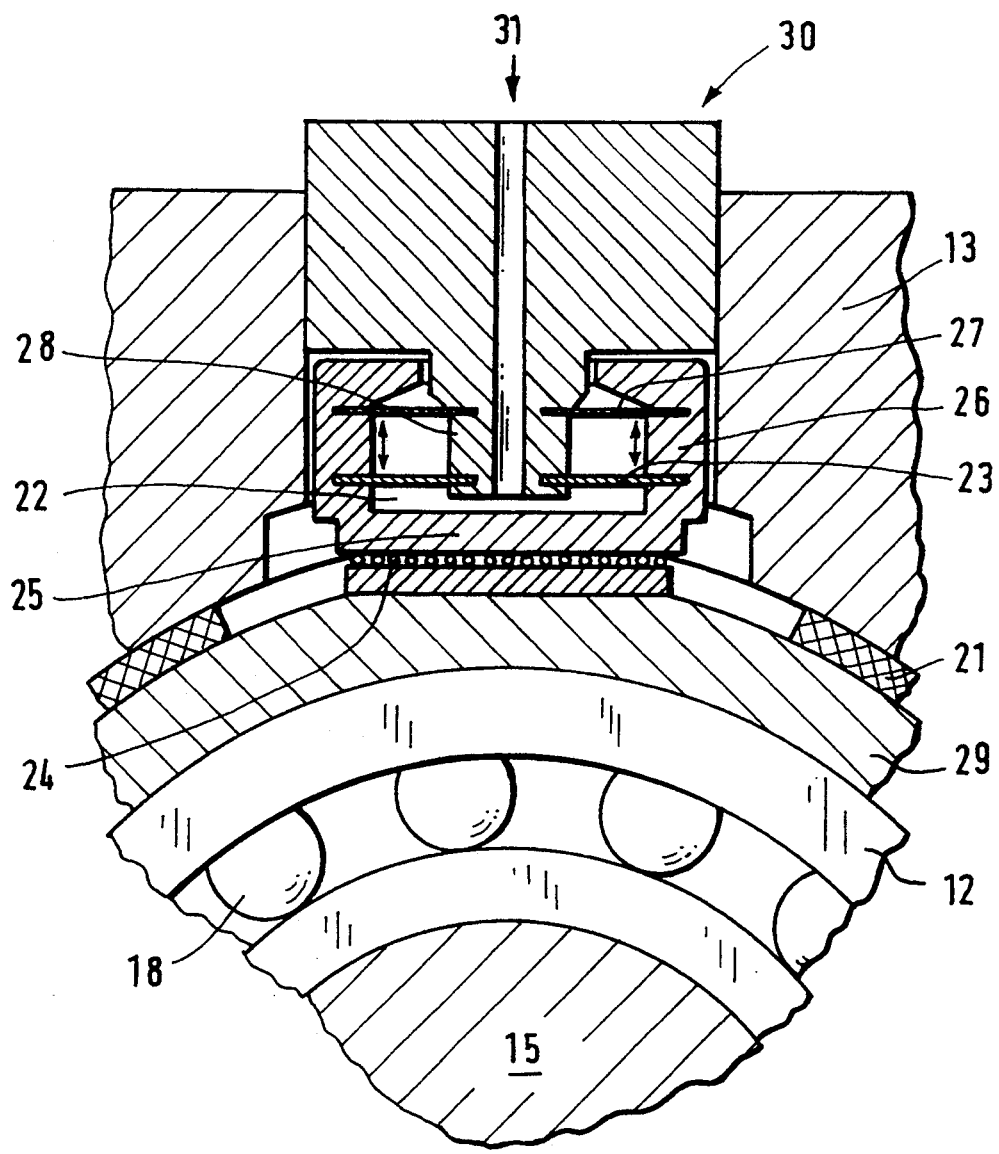
FIG. 4 shows a section through an active hydraulic bearing support having a chamber filled with pressure fluid acting indirectly on the bearing ring with a radially displaceable chamber bottom.

FIG. 4 shows a section through an active hydraulic bearing support (30) wherein the effective radially inward thrust transmitting area of the radially displaceable chamber bottom (25) is in operative thrust transmitting relation to the bearing ring (12) through thrust transmissing elements (24) and an intermediate ring (29). The thrust transmitting elements (24) are rollers.

The radially displaceable chamber bottom (25) together with the radially displaceable chamber side wall (26), the stationary central chamber interior wall (28) and the membrane (23) which connects the chamber side wall (26) with the chamber interior wall (28), forms a closed chamber (22), which is filled with a pressure fluid and is connected via an opening (31) to the servo valve, not illustrated.

A pressure increase introduced into the fluid of the chamber (30) via the servo valve and the opening (31) during operation leads, in the attempt to increase the volume of the chamber (30), to a displacement of the radially displaceable chamber bottom (25), and of the chamber exterior walls (26) connected rigidly thereto, directed radially inward toward the drum shaft (15). This motion is transmitted to the bearing ring (12) via the transmission elements (24), which in the example illustrated are roll bodies but can also be made, for example, spherical, via the intermediate ring (29). In this fashion, there is an indirect force or thrust transmission from the chamber (22) to the bearing ring (12), which force transmission is directed oppositely to the direction of the vibrations of the drum shaft (15), assuming appropriate connection of the servo valve.

In case of the displacement of the chamber bottom (25) and of the chamber side walls (26), the membrane (23) acts as a damping spring. This action can be further intensified if, as shown in FIG. 4, a further membrane (27) is arranged parallel to the membrane (23) between chamber side wall (26) and chamber interior wall (28). The membrane (27) can be made thinner than the membrane (23) because it acts only as a damping spring and is not pressurized by means of a fluid as is the membrane (23).

Also in this illustrated indirectly acting active hydraulic bearing support (30), it is useful additionally to arrange intermediate sound absorbing layers (21) that reduce solid-borne sound between the bearing ring (12) and the bearing housing (13), exactly as in the example of FIG. 3 and for the reasons stated there.

Figure 1:
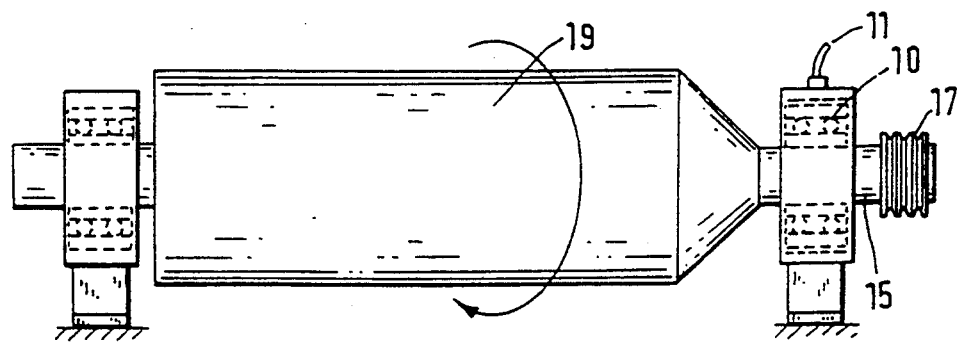
FIG. 1 shows a decanter type centrifuge with an active hydraulic bearing support of the drum shaft.

FIG. 1 shows schematically a favorable support location for an active hydraulic bearing support in case of installation in a decanter (19) having horizontally arranged drum axis (15). By means of the arrangement of the active hydraulic bearing support close to the drive device (17) of the decanter (19), vibrations brought about by the drive are also effectively countered.

Figure 2:
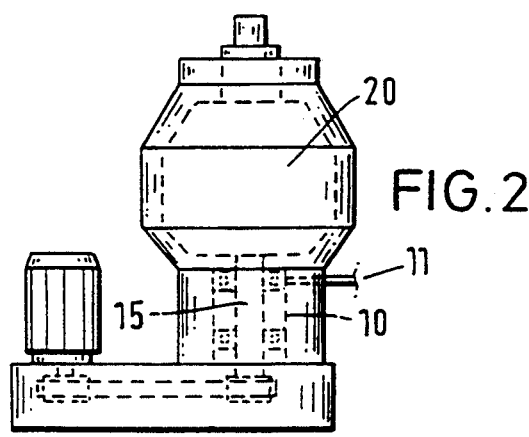
FIG. 2 shows a separator type centrifuge having an active hydraulic bearing support of the drum shaft arranged below the centrifuge drum.

FIG. 2 shows schematically, for a separator (20) having vertical drum axis (15), a favorable support location for an active hydraulic bearing support with regard to the damping of vibrations that originate from the centrifuge drum.

What is claimed is:

1. A centrifuge for the separation of substances differing in density, having a centrifuge drum with a drum shaft supported by bearings for rotation about an axis, said centrifuge comprising:

one of said bearings having an outer bearing ring (12);
   at least one variable pressure hydraulic bearing support (10) supporting said one bearing, said bearing support (10) including a bearing housing (13) enclosing said outer bearing ring (12), said bearing housing (13) including at least one chamber (14) filled with a pressure fluid said chamber having a side nearest said drum shaft;
   a servo valve connecting said chamber (14) to a supply of pressure fluid;
   a membrane (16) closing the side of said chamber nearest said drum shaft (15), said membrane having an effective force transmitting area lying directly against said outer bearing ring (12).

2. The centrifuge of claim 1 wherein said centrifuge is a decanter and comprising a drive (17) connected to one end of said drum shaft (15) and wherein said bearing support (10) is at said one end of said drum shaft (15).

3. The centrifuge of claim i wherein said drum shaft (15) extends vertically and is supported by an upper bearing and a lower bearing.

4. The centrifuge of claim 1 and further comprising an intermediate layer (21) of sound deadening material operatively interposed between said bearing ring (12) and said bearing housing (13) near said hydraulic bearing support (10) said intermediate layer (21) reducing solid-borne sound.

5. The centrifuge of claim 4 wherein said one bearing is supported by a plurality of circumferentially spaced variable pressure hydraulic bearing supports (10) and further comprising:

a plurality of circumferentially spaced intermediate layers (21) of sound deadening material operatively interposed between said bearing ring (12) and said bearing housing (13), said intermediate layers (21) of sound deadening material being positioned circumferentially between said bearing supports (10).

6. A centrifuge for separation of substances differing in density having a centrifuge drum with a drum shaft supported by bearings for rotation about an axis, said centrifuge comprising:

an outer bearing ring (12) constituting a part of one of said bearings;
   at least one variable pressure hydraulic bearing support supporting said one bearing including a bearing housing (13) enclosing said outer bearing ring; and
   an intermediate layer (21) of sound deadening material operatively interposed radially between said bearing ring and said bearing housing (13) near said hydraulic bearing support, said intermediate layer (21) reducing solid-borne sound.

7. The centrifuge of claim 6 wherein said hydraulic bearing support includes at least one chamber (22) filled with a pressurized fluid, said chamber being formed by a stationary central chamber interior wall, a radially displaceable chamber bottom (25) at its radially inner end and operable to transmit thrust radially toward said drum shaft (15, chamber side walls (26) connected to the chamber bottom (25) and a damping membrane (23), connecting said chamber side walls (26) to said stationary central chamber interior wall (28), and further comprising thrust transmitting elements (24) between said chamber bottom (25) and said bearing ring.

8. The centrifuge of claim 7 and further comprising a secondary membrane (27) radially outward of said damping membrane (23), said secondary membrane (27) extending between and interconnecting said chamber side walls (26) to said stationary chamber interior wall (28).

* * * * *